(12) United States Patent
Schroeder et al.

(10) Patent No.: US 7,454,978 B2
(45) Date of Patent: Nov. 25, 2008

(54) VERSATILE STRAIN SENSOR EMPLOYING MAGNETOSTRICTIVE ELECTRICAL CONDUCTORS

(75) Inventors: Thaddeus Schroeder, Rochester Hills, MI (US); Elias Taye, Macomb Township, MI (US); Bruno Lequesne, Troy, MI (US)

(73) Assignee: Delphi Technologies, Inc., Troy, MI (US)

( * ) Notice: Subject to any disclaimer, the term of this patent is extended or adjusted under 35 U.S.C. 154(b) by 68 days.

(21) Appl. No.: 11/280,923

(22) Filed: Nov. 16, 2005

(65) Prior Publication Data

US 2007/0107528 A1 May 17, 2007

(51) Int. Cl.
*G01B 7/24* (2006.01)
(52) U.S. Cl. ............... 73/779; 340/665; 340/572.6
(58) Field of Classification Search ............ 73/779; 340/665, 572.6, 505, 442
See application file for complete search history.

(56) References Cited

U.S. PATENT DOCUMENTS

| 6,786,084 B2 | 9/2004 | Schroeder et al. |
| 6,941,824 B2 | 9/2005 | Morelli et al. |
| 2002/0078765 A1* | 6/2002 | Shinoura ............... 73/862.333 |
| 2003/0096162 A1* | 5/2003 | Lasater et al. ............... 429/184 |
| 2004/0107777 A1 | 6/2004 | Lequesne et al. |
| 2005/0000278 A1* | 1/2005 | Haralampu et al. ........... 73/146 |

OTHER PUBLICATIONS

ASM, "Special-Purpose Nickel Alloys"; ASM Specialty Handbook: Nickel, Cobalt, and Their Alloys (#06178G); pp. 92-105. 2000. [accessed] Jun. 2, 2007. <http://www.asminternational.org/Template.cfm?Section=SneakPreview&template=Ecommerce/FileDisplay.cfm&file=ACF7F5.pdf>.*
Ludwig et al., "High-Frequency Magnetoelastic Multilayer Thin Films and Applications", IEEE Transactions on Magnetics, pp. 3062-3066, vol. 39, No. 5, Sep. 2003. Accessed Oct. 15, 2007. <http://ieeexplore.ieee.org/iel5/20/27635/01233304.pdf?arnumber=1233304>.*

* cited by examiner

*Primary Examiner*—Edward Lefkowitz
*Assistant Examiner*—Jonathan Dunlap
(74) *Attorney, Agent, or Firm*—Paul L. Marshall (57) ABSTRACT

A strain sensor includes a load carrying body configured to strain in response to a load applied along a load path. The sensor further includes a magnetostrictive electrical conductor affixed to the body but out of the load path. Application of the load causes the body to strain, which in turn results in a proportional stress being imparted to the magnetostrictive conductor, altering its magnetic permeability. A circuit is electrically connected to the conductor to detect such changes in permeability, which are indicative of the applied load.

24 Claims, 5 Drawing Sheets

VERSATILE STRAIN SENSOR EMPLOYING MAGNETOSTRICTIVE ELECTRICAL CONDUCTORS

TECHNICAL FIELD

The present invention relates to a magnetostrictive strain sensor, and more particularly, to a versatile strain sensor employing magnetostrictive electrical conductors.

BACKGROUND OF THE INVENTION

It is known how to provide a load sensor based on a piezoresistive principle, using either strain gages attached to a stressed member, or integrated into a silicon chip. Such conventional sensors, however, are not only expensive, but also lack the robustness required in certain environments, such as in automotive and industrial applications.

It is also known to provide a sensor based on the Villari effect wherein a magnetostrictive material changes its magnetic permeability μ in response to variations in the applied stress (force).

In this regard, one type of configuration of such a strain sensor includes a conductive wire that is wrapped around a separate core member formed of magnetostrictive material. The strain sensor includes a ferromagnetic carrier that provides a return path for the magnetic flux outside of the wire coil. An air gap exists between the ferromagnetic carrier and the core member. An electrical current flowing through the wire coil generates a magnetic field that surrounds the wire and propagates partially within the core member. A strain applied to the core member changes the magnetic permeability therein. Inductance of the wire coil is a function of the permeability of the material through which the coils magnetic field flows. Thus, the strain applied to the core member changes the inductance of the wire coil. A drawback with such a strain sensor is that the air gap offers a permeability several orders of magnitude less than that of the core or the ferromagnetic carrier, so even a very small air gap significantly increases the magnetic flux reluctance. As a result, the sensitivity of the strain sensor is reduced. Further, manufacturing tolerances affect the size of the air gap during manufacture of the strain sensor, which results in inconsistent strain measurements by such sensors.

Accordingly, a practical design must comprise a complete magnetic circuit to obtain the required sensitivity and avoid the influence of external magnetic fields. As alluded to above, it is important to minimize air gaps in the path of the magnetic flux. Thus, two features of this type of force sensor that can make a practical implementation challenging are as follows: (1) both the load carrying and the load sensing functions are performed by the same part—the magnetostrictive shaft, which prevents independent optimization of each function; and (2) air gap minimization.

U.S. Patent Application Publication No. US 2004/0107777 A1 entitled "UNIVERSAL MAGNETOSTRICTIVE FORCE SENSOR" to Lequesne et al. discloses a magnetostrictive force sensor having a shell completely enclosing both the magnetostrictive shaft and the coil, which partially addresses the above challenge pertaining to air gap control. Even in view of this, however, challenges remain insofar as the load sensing function and load carrying function still coexist in the shaft (i.e., the load sensing component is in the load path, and thus must be big and durable enough to handle the load).

There is therefore a need for a strain sensor based upon the Villari effect that minimizes or eliminates one or more of the shortcomings set forth above.

SUMMARY OF THE INVENTION

One object of the present invention is to provide a solution to one or more of the problems set forth above in the Background. A strain sensor in accordance with the present invention includes a body, a magnetostrictive electrical conductor affixed to the body, and an excitation and detection circuit. The body is configured to strain in response to an external influence applied to the body along a predetermined load path. The external influence is in-effect a source of strain which may be an applied force, torque, pressure or the like. The magnetostrictive electrical conductor, while affixed to the body, is affixed outside of the predetermined load path such that a stress is produced in the conductor upon application of the external influence to the body. The magnetostrictive electrical conductor has a magnetic permeability whose value varies as a function of the imparted stress originating from the body. The excitation and detection circuit is electrically connected to the magnetostrictive electrical conductor and is configured to generate an output signal that is indicative of the produced strain. In one embodiment, the output signal is further indicative of the applied load causing the strain in the body.

In a further embodiment, the body comprises a toroidal shell having an axis, with an inside diameter circumscribing a central through-bore and an outside diameter. The magnetostrictive electrical conductor is in the form of a wire and is affixed to one of either the inside diameter or the outside diameter of the shell. In the former case, the magnetostrictive electrical conductor (wire) is placed in compressive stress while in the latter case it is placed in tensile stress.

By placing the magnetostrictive electrical conductor (wire) outside of the load path, the function of load carrying, which is performed by the toroidal shell, can be independently optimized relative to the function of load sensing, which is performed by the magnetostrictive electrical conductor (wire). This decoupling of functions allows optimization of the configuration of the component performing each function, overcoming the shortcomings of the prior art.

In still further alternate embodiments, the body may comprise various flexible bodies, including a beam configured for flexure in response to a source of strain, an open C-shaped ("half") shell body, or other similar bodies that experience a deformation or flexure responsive to an applied load respectively.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
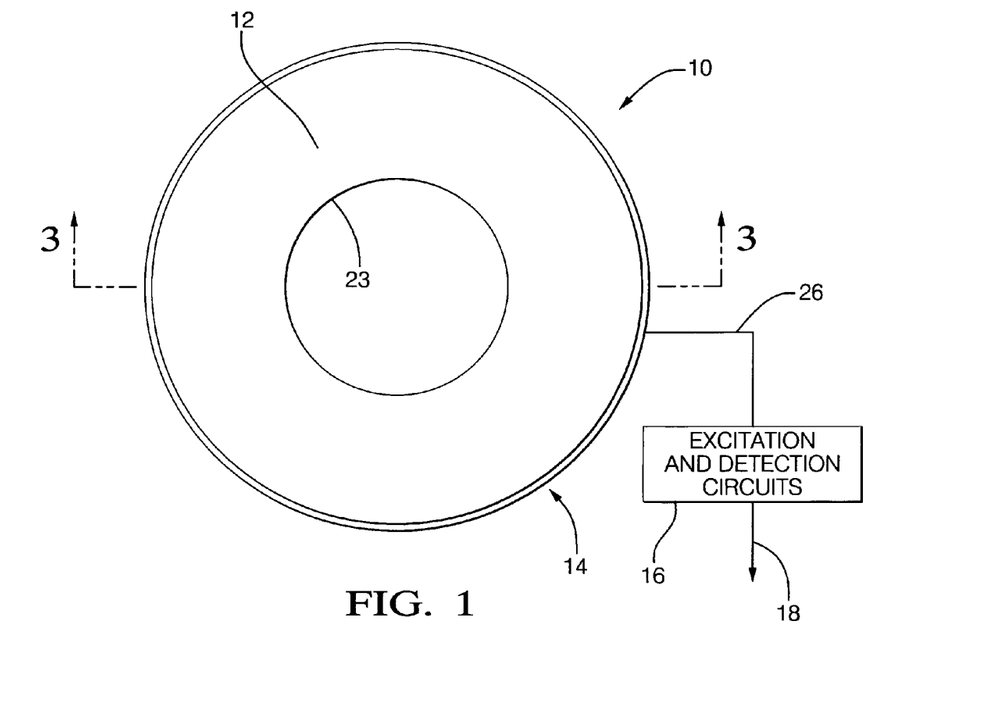
FIG. 1 is a block and diagrammatic view of a strain sensor in accordance with a first embodiment of the present invention particularly employing a steel, toroidal shell as the load carrying body.

Referring now to the drawings wherein like reference numerals are used to identify identical components in the various views, FIG. 1 is a combined block and diagrammatic diagram view of a strain sensor 10 in accordance with the present invention. The strain sensor 10 is based upon the characteristics of magnetostrictive material, such characteristics being described more fully in U.S. Published Patent Application No. US 2004/0107777 A1 for "UNIVERSAL MAGNETOSTRICTIVE FORCE SENSOR" to Lequesne et al., hereby incorporated by reference in its entirety.

It should be appreciated that a strain sensor in accordance with the present invention measures an amount of strain experienced by a load carrying flexible body, as will be described in greater detail hereinafter. Such a strain sensor may be usefully employed for measurement of an external influence resulting in such strain, such as an amount of force, an amount of torque, or an amount of pressure. Appreciated in a broader context, the present invention comprises the use of a body that is flexible or deformable in some manner when subjected to a source of strain along a load path, wherein the flexible body imparts a proportional load by creating a stress applied to an electrically conductive, magnetostrictive wire disposed outside of the load path. By providing separate components as described, the load carrying function and the load sensing function may be decoupled, thereby allowing independent optimization of both. Through this decoupling, the load carrying function implemented in the flexible body can be optimized to accommodate the expected range of load.

Returning now to FIG. 1, strain sensor 10 includes a load carrying flexible or deformable body 12, a magnetostrictive electrical conductor 14, and an excitation and detection circuit 16 configured to generate an output signal 18.

Body 12 is configured to strain in response to an external influence applied thereto along a predetermined load path. The external influence may be a force, a torque or a pressure. In the illustrated embodiment, body 12 takes the form of a toroidal shell (e.g., made from steel) as the load carrying member for sensor 10. In general, the mechanical/structural design of the toroidal shell 12 is such that an elastic deformation is obtained across an anticipated range of input load.

As described above, the inventive sensor 10 uses a separate part (i.e., the body 12) for load carrying that needs to meet only a single criterion—to be sufficiently strong mechanically to accept the contemplated load (or range of load).

Figure 2:
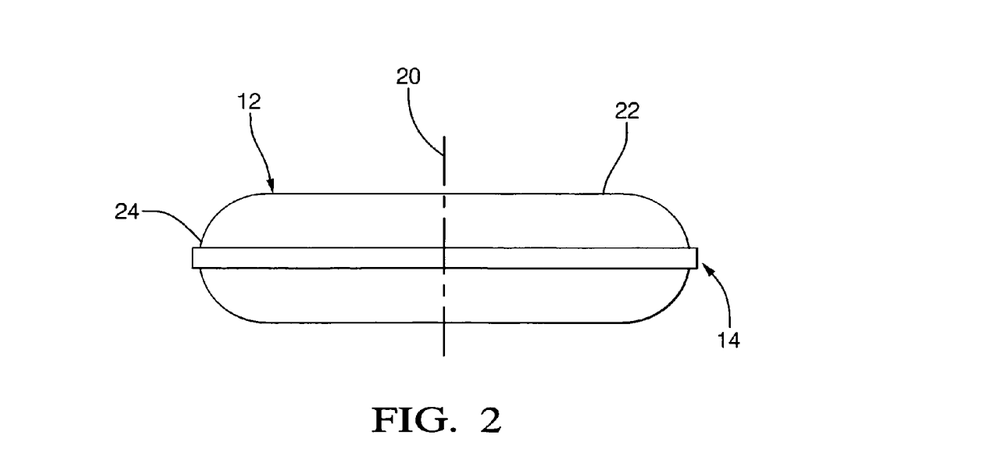
FIG. 2 is a side, diagrammatic view of the toroidal shell of FIG. 1.

FIG. 2 is a diagrammatic side view of the embodiment of FIG. 1. In the embodiment of FIGS. 1-4, the magnetostrictive conductor 14 is provided in the form of a wire 14. Magnetostrictive wire 14 is affixed to shell 12 outside of the load path such that a stress is produced in the magnetostrictive wire 14 upon application of the load to shell 12. As shown in FIGS. 1 and 2, toroidal shell 12 includes an axis 20 and has a load surface 22 upon which the load is applied. The load path extends generally along axis 20 and is parallel thereto. Shell 12 in the illustrated embodiment includes an inside diameter (I.D.) 23 circumscribing a central through-bore and an outside diameter (O.D.) 24.

The magnetostrictive wire 14 has a magnetic permeability whose value varies as a function of the stress imparted thereto from the toroidal shell 12. Magnetostrictive wire 14 as shown may take the form of a wire, but may also be provided in other forms. Magnetostrictive wire 14 may have a composition known to those of ordinary skill in the art for magnetostrictive materials, but for purposes of example only may be a nickel iron alloy, preferably having nickel in the range of 30-82%, and may be, in one non-limiting example, made from Alloy 52 comprising 50.5% Ni and 49.5% Fe. In another non-limiting embodiment, the nickel alloy wire may have 62% Ni and 48% Fe. In a still further non-limiting embodiment, magnetostrictive conductor 14 may comprise iron-gallium alloy material, such as commercially available under the GALFENOL trade name. It is to be understood that nickel alloy wire percentages greater or less than the aforementioned example are considered to be within the spirit and scope of the present invention.

With continued reference to FIG. 1, excitation and detection circuit 16 is configured generally for exciting the magnetostrictive wire 14 with an interrogating signal (e.g., current or voltage), detecting changes in the permeability of magnetostrictive wire 14 and generating an output signal 18 indicative of the strain in shell 12 (based on the permeability changes). Excitation and detection circuit 16 is electrically connected to the magnetostrictive wire 14 by way of electrical connection 26. In one embodiment, to be described in greater detail below, excitation and detection circuit monitors and detects changes in the inductance of magnetostrictive electrical wire 14 and reports such detected inductance values in the form of output signal 18. This approach provides an accurate assessment since changes in inductance are a function of the changes in magnetic permeability of the wire 14.

Figure 3:
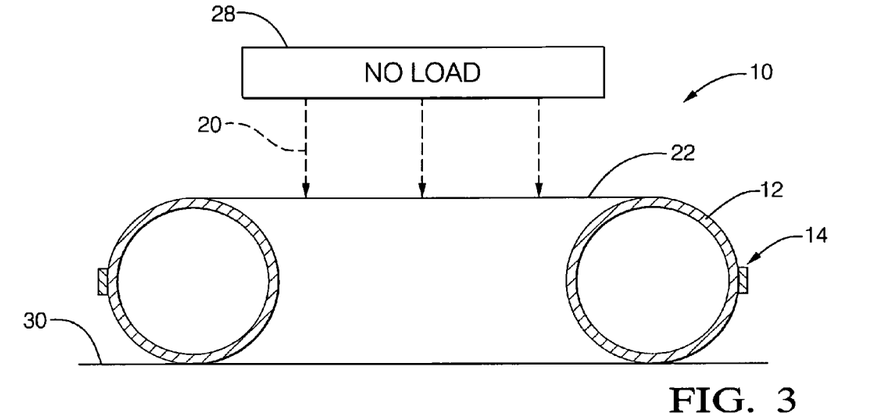
FIG. 3 is a diagrammatic and cross-sectional view of the toroidal shell taken substantially along lines 3-3 in FIG. 1, in a relaxed state.
Figure 4:
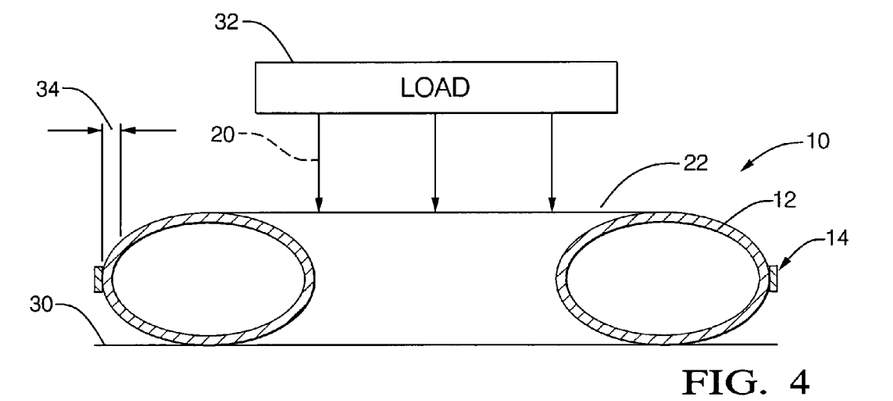
FIG. 4 is diagrammatic and cross-sectional view similar to FIG. 3 but shown when subjected to a source of strain.

FIGS. 3 and 4 show strain sensor 10 in a relaxed state and under load, respectively. In FIG. 3, the block 28 labeled "NO LOAD" represents the absence of an external influence (load) applied to the strain sensor 10. A reaction surface 30 is provided for reference. In operation, without any applied load, the toroidal shell 12 and the magnetostrictive wire 14 are both in a relaxed state. The magnetic permeability assumes some initial state (value) corresponding to an absence of an applied load with the resulting absence of strain in shell. Although not shown, in an alternate embodiment, wire 14 may be configured to have an initial pre-stress applied thereto. In such alternate embodiment, the initial pre-stress would alter the magnetic permeability to some predetermined value. This value would then be calibrated to correspond to a "NO LOAD" condition.

Figure 7:
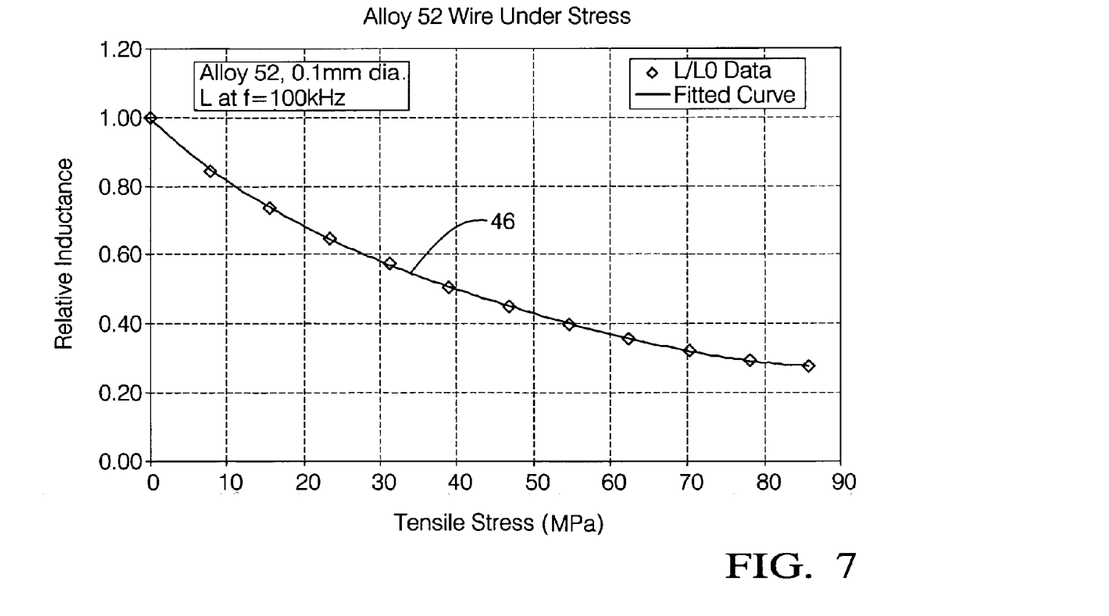
FIG. 7 is a simplified inductance versus stress chart showing the operation of the strain sensor of FIGS. 5 and 6.

FIG. 4 shows strain sensor 10 in operation for the case of axial loading in the form of a load 32 applied along a load path parallel to axis 20. Upon such axial loading, the toroidal shell 12 deforms (strains), increasing its outside diameter (which change is designated by reference numeral 34). This increase in the O.D. in turn generates a stress, which in this example is a tensile stress, in the magnetostrictive wire 14. This increase in tensile stress in magnetostrictive wire 14 decreases its magnetic permeability (or increases, depending on the material). Accordingly, the excitation and detection circuit 16 observes a decrease (or increase) in the inductance presented by magnetostrictive wire 14 (a decrease in inductance is best shown in the chart of FIG. 7).

In sum, the deformation of toroidal shell 12 imparts a tensile stress of a desired (i.e., proportional) magnitude to the magnetostrictive, electrically conductive wire 14, which responds to that stress by a change (e.g., decrease) in permeability resulting in a change in observed inductance. The magnetic field created by the inductance interrogating current (generated by circuit 16) is completely contained within the wire—no external magnetic circuit is required. Hence, there are no air gaps in the magnetic flux path that would compromise sensitivity, as described in the Background with prior sensor systems. In addition, since the magnetostrictive wire 14 is outside of the load path, such arrangement removes a significant design restriction existent in the prior art, because for large loads, a magnetostrictive wire would otherwise have to be correspondingly large as well as being configured to accommodate the large load. The present invention thus also solves this shortcoming as well.

Another aspect of the present invention provides temperature compensation. Temperature fluctuations can alter the output signal 18 inasmuch as temperature, as known, affects the wire conductivity, and therefore the eddy current penetration, the flux pattern and ultimately the resistance and inductance of the wire, in this case, wire 14.

Figure 5:
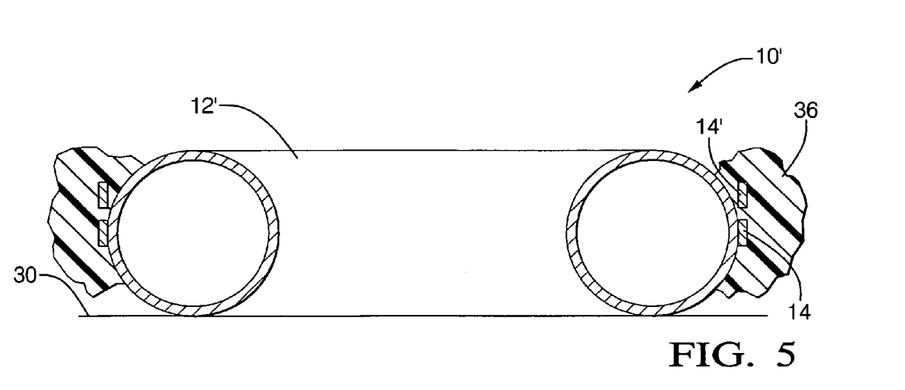
FIG. 5 is a diagrammatic, cross-sectional view of a second embodiment in accordance with the present invention employing a non-stressed, second magnetostrictive electrical conductor for temperature compensation.

FIG. 5 shows a second embodiment of the present invention configured for achieving temperature compensation. A strain sensor 10', similar to the strain sensor 10 in FIG. 1 but with temperature compensation, includes a similarly configured toroidal shell, designated 12', but further includes a second, matching magnetostrictive electrical conductor 14'. Magnetostrictive conductor 14', however, is not rigidly attached to the surface of the toroidal shell 12', and hence, its inductance is not affected by the applied load, but rather only by the ambient temperature (as described above). As shown, the non-stressed, reference magnetostrictive conductor 14' may be mounted loosely on "top" of the main sensing conductor 14, for example, embedded in an elastomer 36 or the like.

Figure 6:
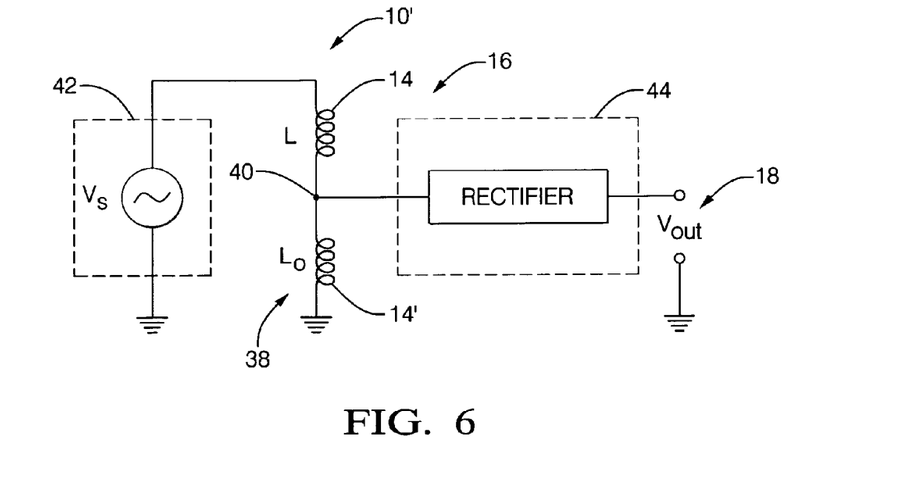
FIG. 6 is a schematic and block diagram view of the embodiment shown in FIG. 5 showing an excitation and detection circuit.

FIG. 6 is a schematic and block diagram view of the temperature-compensated strain sensor 10' of FIG. 5, particularly showing details of the excitation and detection circuit 16. This embodiment can be used to obtain a temperature-compensated output signal 18 indicative of the strain in the toroidal shell, and thus further indicative of the external influence giving rise to such strain (e.g., force, torque, pressure, etc.).

The schematic in FIG. 6 illustrates the main, load sensing magnetostrictive wire 14 electrically coupled with the temperature-compensation conductor or wire 14' in a voltage divider arrangement 38 which has a common node 40. FIG. 6 further shows excitation and detection circuit 16, shown as a block in FIG. 1, implemented in exemplary fashion by way of an excitation source 42, which may be a sinusoidal, AC voltage source $V_S$, and a detection circuit 44 which may take the form of a rectifier or the like.

The circuit shown in FIG. 6 can be used for the measurement of dynamic inductance. The inductance of the temperature-compensating wire 14' may be considered fixed, at least in relation to stress-induced changes while the inductance of magnetostrictive wire 14 varies as a function of load, since its permeability varies correspondingly. It should be appreciated that with two wires 14 and 14', any changes in the electrical characteristics due to temperature will be approximately the same, and hence will "drop out" in view of the voltage divider arrangement.

The voltage $V_S$ is imposed by source 42 at a frequency f chosen for best sensitivity. In general, any frequency can be used. For example, a frequency of 100 kHz was used in the sample chart in FIG. 7. The limiting factor to be considered comprises the sensor response time $t_R$ required for any particular use or application. According to the well-known sampling theorem, the excitation frequency f should be no less than two times of $$\frac{1}{t_R}.$$

However, the preferred value may be 5 to 10 times the value of $$\frac{1}{t_R}.$$

In view of the use of an AC excitation source $V_S$, detection circuit 44 is shown as a rectifier 44 provides a straightforward way to measure the change in inductance due to changing load. It should be appreciated, however, that more sophisticated detection circuitry may be used as known in the art, for example only, an RMS voltage detector, or other suitable circuitry.

The measurement of the varying inductance of wire 14 due to varying load may be performed by measuring the change across the voltage divider 38, which is generated as an output $V_{OUT}$, output signal 18. The inductance L of sensing wire 14 is related to the magnitude of the applied and measured voltages as known to one of ordinary skill in the art.

Although not shown, the output voltage $V_{OUT}$ can be processed by a microprocessor or other similar processing circuit to obtain the relationship between the stress in the sensing magnetostrictive wire 14 and the relative inductance. Further processing may also provide a mechanism for compensating for any non-linearities in the stress—vs.—inductance relationship. Further processing may relate the stress in the sensing conductor 14 to the applied source of strain (e.g., force, torque, pressure, etc.).

FIG. 7 shows a chart having a trace 46 representing the relationship between relative inductance (i.e., the ratio of $$\frac{L}{L_O},$$

which is produced by voltage divider 38) and tensile stress. Note that, as described above, for that particular material, an increase in tensile stress results in a decrease in the magnetic permeability, and thus also decreases the inductance of the sensing wire 14 relative to the non-stressed non-sensing wire 14'. Accordingly, trace 46 is characterized by a negative slope.

Figure 8:
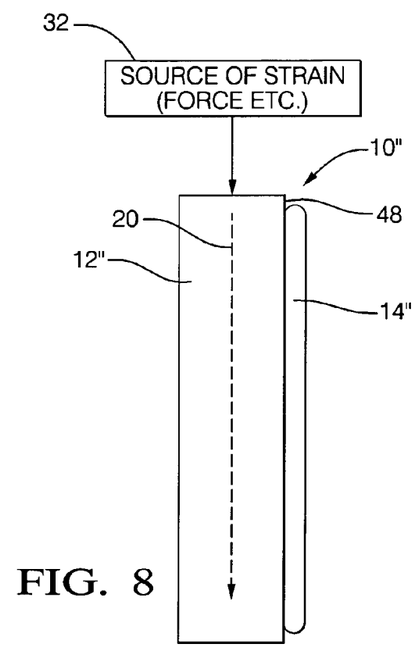
FIGS. 8-10 are diagrammatic and block diagram views of a third embodiment of the present invention, employing a beam as the load carrying flexible body configured to strain in response to an applied load.
Figure 9:
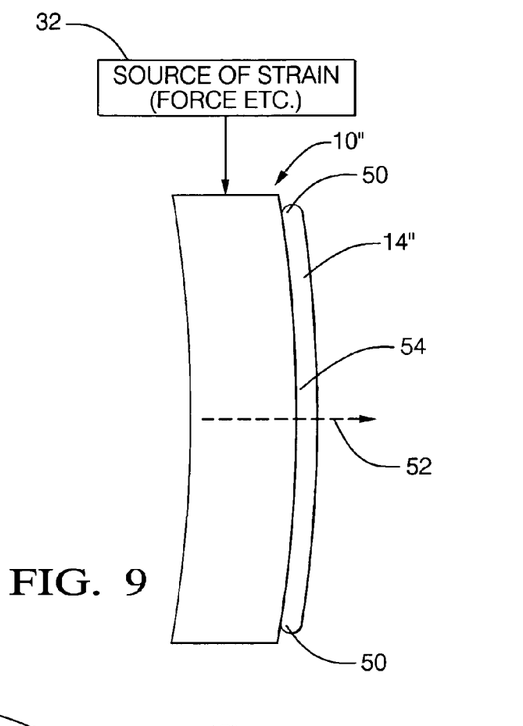
Figure 10:
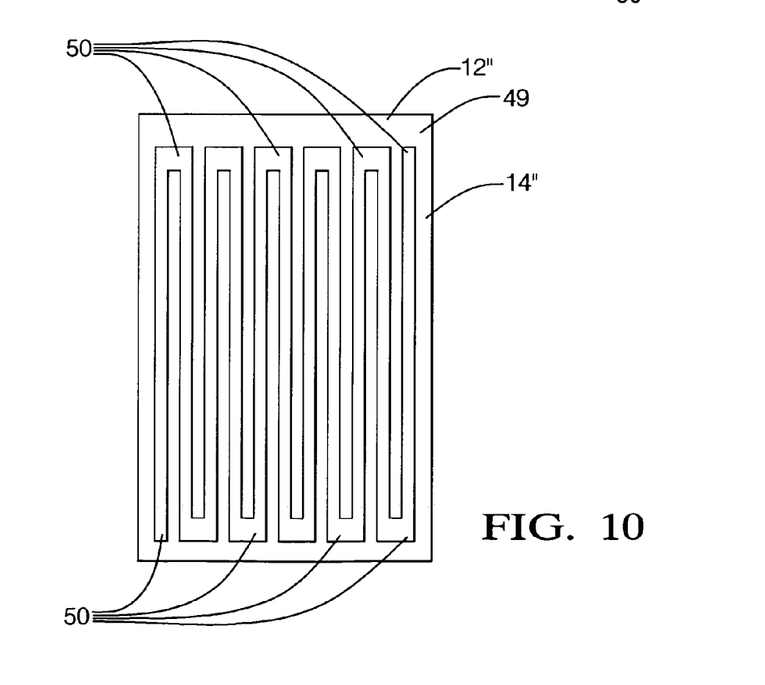

FIGS. 8-10 illustrate yet another embodiment of the present invention, designated as strain sensor 10''. Seen in a broader view, the present invention comprises the combination of a flexible, or deformable, member defining a load body provided for use in the main load path. This flexible load carrying body imparts a proportional load to an electrically conductive/magnetostrictive wire placed outside of the load path.

In the embodiment illustrated in FIGS. 8-10, load carrying body 12 comprises a beam designated by reference numeral 12". FIG. 8 in particular shows beam 12" having an axis 20 and a side 48. Side 48 is the side of beam 12" that is configured to experience flexure in response to the applied load (i.e., source of strain). Beam 12" is thus configured to flex in response to a source of strain 32 provided along the load path, which in this embodiment is coextensive with and extends along axis 20. In the embodiment of FIGS. 8-10, the magnetostrictive conductor comprises a magnetostrictive wire 14" wound in a serpentine fashion and attached in a manner to be described on side 48 of beam 12". The direction of the flexure is designated by reference numeral 52 in FIG. 9.

The magnetostrictive wire 14", in the illustrated embodiment, is anchored to beam 12" at predetermined anchor points 50, as shown in FIGS. 9 and 10. Anchor points 50 are points on side 48 that have a reduced amount of flexure, for example, as compared with a central point 54 that experiences the greatest amount of flexure (best shown in FIG. 9). Without such anchoring, magnetostrictive wire 14" could move in response to the flexing of beam 12", in which case no effect could be measured. Anchor points 50, in a preferred embodiment, are located at points on side 48 having a minimum amount of flexure.

In operation, beam 12" flexures in direction 54 when a source of strain is applied thereto. The flexure stresses magnetostrictive wire 14", changing its permeability proportionally. Circuit 16 can be used in the same manner as above to detect and report this change.

Figure 11:
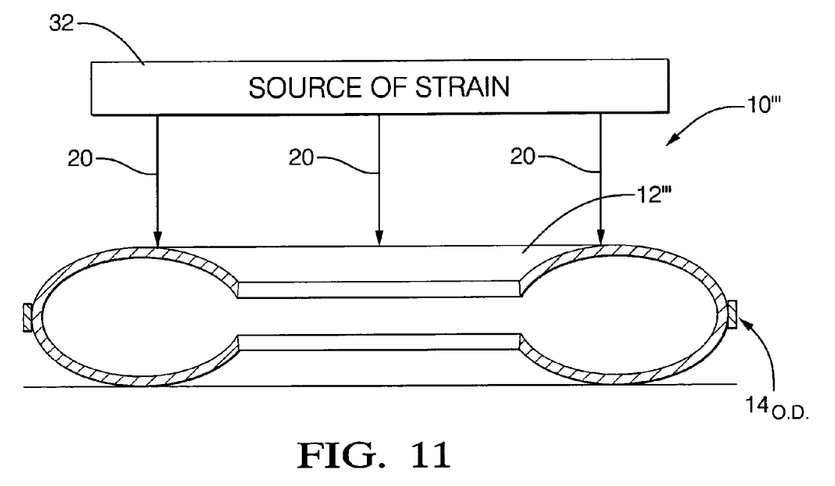
FIG. 11 is a diagrammatic view of yet another embodiment of the present invention employing a C-shaped toroid as the load carrying flexible body configured to strain in response to an applied load.

FIG. 11 shows yet another embodiment of the inventive strain sensor, designated by reference numeral 10'". Strain sensor 10'" includes a further variation of the flexible load carrying body, which is designated body 12'". Body 12'" takes the form of an open C-shaped toroid. The general operation of the embodiment of FIG. 11 is the same as that described above in connection with toroidal shells 12, 12', and beam 12". A magnetostrictive conductor such as 14 is disposed on an outside diameter of open C-shaped toroid 12'", and which is designated $14_{OD}$. Note that in this embodiment (and in the earlier described embodiments), the stress imparted to the magnetostrictive wire is a tensile stress. However, the present invention is not so limited, and configurations that impart a compressive stress to the magnetostrictive electrically conductive wire 14 are specifically contemplated as within the spirit and scope of the invention.

In operation, toroid 12'" deforms generally in the same fashion as shell 12 and shell 12' when a load is applied thereto. They deformation stresses the magnetostrictive wire 14, changing its permeability proportionally. Circuit 16 can be used in the same manner as above to detect and report this change.

Figure 12:
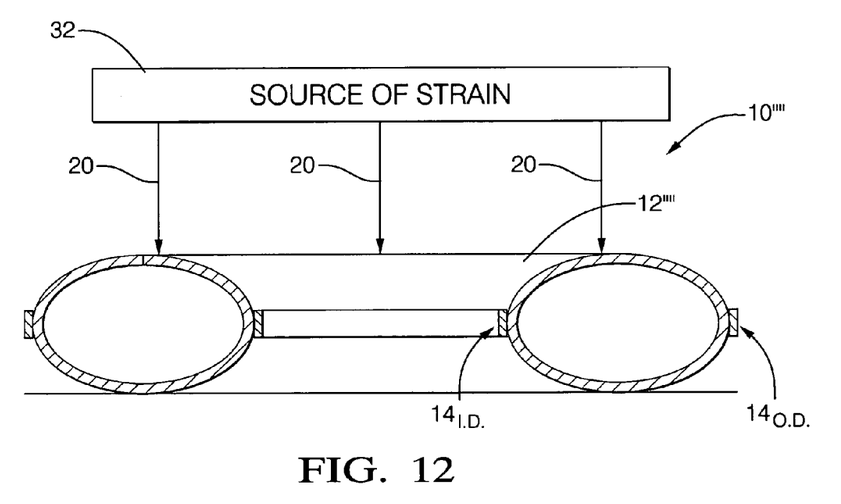
FIG. 12 is a diagrammatic view of the C-shaped embodiment of FIG. 11 having the magnetostrictive electrical conductor arranged for either tensile stress (O.D.) or compressive stress (I.D.).

FIG. 12 is a diagrammatic, side view of still yet another embodiment of the present invention, designated strain sensor 10"". In this embodiment, the source of strain compressing the toroid 12"" is such that the magnetostrictive wire $14_{ID}$ on the inner radius of the toroid is under compressive stress. Likewise, the magnetostrictive wire on the outside diameter, designated $14_{OD}$, is under tensile stress. The reverse of the above description is true if the source of strain were to stretch the toroid rather than compress it (e.g., as may be the case for non-axial loading). This embodiment operates on the same principles as above, but shows arrangements for both compressive and tensile stress.

It is to be understood that although the term "wire" has been used herein, such is meant to represent not only wires in a conventional form, but to encompass any electrically conductive strip. In particular, in the present invention, magnetostrictive conductors cover traces deposited or etched on ceramic or other substrates. The wire, or traces, may encompass a single, or several, turns around the periphery of the load carrying member.

It is also to be understood that compression and tension as shown in these examples are not limiting. In some instances, particularly with pressure sensors, the strain may be tensile to start with. Whether the initial stress is compressive or tensile, depending on design details, the flexure or deformation may place the conductive, magnetostrictive wire under either tension or compression.

The invention claimed is:

1. A stain sensor comprising:
a body configured to strain in response to an external influence applied thereto along a predetermined load path;
a magnetostrictive electrical conductor affixed to said body outside of said predetermined load path such that a stress is produced in said conductor upon application of said external influence to said body, said magnetostrictive conductor having a magnetic permeability whose value varies as a function of said stress;
an excitation and detection circuit electrically connected to said magnetostrictive electrical conductor configured to generate an output signal indicative of said strain in response to said variable magnetic permeability of said conductor.

2. The sensor of claim 1 wherein said external influence comprises one of force, torque and pressure.

3. The sensor of claim 1 wherein said strain comprises one of deformation and flexure.

4. The sensor of claim 1 wherein said output signal is further indicative of said external influence applied to said body resulting in said strain.

5. The sensor of claim 1 wherein said body comprises a toroidal shell having an axis, said toroidal shell having an inside diameter circumscribing a central through-bore and an outside diameter, said magnetostrictive electrical conductor being affixed to at least one of said inside diameter and said outside diameter.

6. The sensor of claim 5 wherein said load path is coextensive with said axis.

7. The sensor of claim 6 wherein said conductor is affixed to said outside diameter such that said stress comprises a tensile stress.

8. The sensor of claim 6 wherein said conductor is affixed to said inside diameter such that said stress comprises a compressive stress.

9. The sensor of claim 5 wherein said toroidal shell comprises steel.

10. The sensor of claim 1 wherein said external influence defines a load and said body is configured for elastic deformation ova a predetermined range of load applied through said load path.

11. The sensor of claim 1 wherein said magnetostrictive electrical conductor is a first magnetostrictive electrical conductor, said sensor further including a second magnetostrictive electrical conductor located proximate said body configured so as to be immune from said strain, said excitation and detection circuit being further electrically connected to said second magnetostrictive electrical conductor and configured to generate said output signal with temperature compensation.

12. The sensor of claim 11 wherein said second magnetostrictive electrical conductor is disposed proximate said first magnetostrictive electrical conductor and embedded in an elastomer.

13. The sensor of claim 1 wherein said body comprises an elongated beam having a longitudinal axis, said load path being coextensive with said longitudinal axis, said beam having a side configured to experience flexure in response to said external influence, said magnetostrictive electrical conductor being disposed on said side wherein said magnetostrictive conductor is affixed to said side at predetermined anchor points.

14. The sensor of claim 13 wherein said magnetostrictive electrical conductor extends in a serpentine fashion on said side of said beam.

15. The sensor of claim 13 wherein said predetermined anchor points are proximate respective axial ends of said beam.

16. The sensor of claim 1 wherein said magnetostrictive electrical conductor comprises a nickel iron alloy.

17. The sensor of claim 16 wherein nickel comprises 30-82 percent of said allay.

18. The sensor of claim 17 wherein said conductor is NiFe Alloy 52.

19. The sensor of claim 1 wherein said magnetostrictive electrical conductor comprises iron-gallium alloy material.

20. The sensor of claim 1 wherein said magnetostrictive electrical conductor comprises traces on a substrate famed through one of deposition or etching.

21. The sensor of claim 1 wherein said excitation and detection circuit comprises a sinusoidal voltage source producing a sinusoidal voltage signal configured to excite said magnetostrictive electrical conductor.

22. The sensor of claim 21 wherein said excitation and detection circuit includes a rectifier.

23. The sensor of claim 22 wherein said magnetostrictive electrical conductor is a first magnetostrictive electrical conductor, said sensor further including a second magnetostrictive electrical conductor located proximate said body configured so as to be immune from the effects of said strain so as to provide for temperature compensation, said first and second magnetostrictive electrical conductors being arranged in a voltage divider network having a common node, said sinusoidal voltage signal being applied across said voltage divider network, said rectifier being arranged between said common node and a ground node to produce said output signal.

24. The sensor of claim 1 wherein said body comprises an open, C-shaped toroid.

\* \* \* \* \*